US012572117B2

(12) United States Patent
Philippon et al.

(10) Patent No.: US 12,572,117 B2
(45) Date of Patent: Mar. 10, 2026

(54) MULTIFUNCTION CORRECTION DEVICE FOR A TIMEPIECE AND TIMEPIECE COMPRISING SUCH A MULTIFUNCTION CORRECTION DEVICE

(71) Applicant: ETA SA MANUFACTURE HORLOGÈRE SUISSE, Grenchen (CH)

(72) Inventors: David Philippon, St-Imier (CH); Roman Egli, Neuendorf (CH); Raphaël Courvoisier, Corcelles (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 523 days.

(21) Appl. No.: 18/077,751

(22) Filed: Dec. 8, 2022

(65) Prior Publication Data

US 2023/0195038 A1 Jun. 22, 2023

(30) Foreign Application Priority Data

Dec. 16, 2021 (EP) .................................... 21215203

(51) Int. Cl.
*G04B 27/00* (2006.01)
*G04B 3/04* (2006.01)

(52) U.S. Cl.
CPC ........... *G04B 27/004* (2013.01); *G04B 3/046* (2013.01)

(58) Field of Classification Search
CPC .. G04B 27/001; G04B 27/002; G04B 27/004; G04B 27/008; G04B 27/02;
(Continued)

(56) References Cited

U.S. PATENT DOCUMENTS

2008/0159081 A1 7/2008 Laucella et al.
2010/0187074 A1* 7/2010 Manni .................... G04C 3/004 200/4

(Continued)

FOREIGN PATENT DOCUMENTS

CH 708 356 A1 1/2015
CH 711 600 A1 4/2017

(Continued)

OTHER PUBLICATIONS

European Search Report for EP 21 21 5203, dated Jun. 2, 2022.

*Primary Examiner* — Renee S Luebke
*Assistant Examiner* — Matthew Daniel Hwang
(74) *Attorney, Agent, or Firm* — Sughrue Mion, PLLC

(57) ABSTRACT

A multifunction correction device (100) for a case (2) of a timepiece including a horological movement (1). The correction device includes: a cylindrical body (110) integral with the timepiece case (2); a primary correction module (120) moving in translation in a first direction, having a primary control member (121) integral with a primary control stem (123), which operates a first function corrector (10) of the horological movement (1); and a secondary correction module (130) moving in translation in a second direction parallel to the first direction, the secondary correction module (130) comprising a secondary control member (131) integral with a secondary control stem (133), which operates a second function corrector (12) of the horological movement (1), the cylindrical body (110) receiving the primary correction module (120) and the secondary correction module (130).

22 Claims, 3 Drawing Sheets

(58) Field of Classification Search
CPC .... G04B 27/023; G04B 27/026; G04B 27/04; G04B 27/045; G04B 3/046
See application file for complete search history.

(56) References Cited

U.S. PATENT DOCUMENTS

| | | | | |
|---|---|---|---|---|
| 2015/0023142 A1* | 1/2015 | Breuillot | G04B 37/103 368/290 |
| 2019/0137938 A1* | 5/2019 | Riedo | G04B 3/02 |

FOREIGN PATENT DOCUMENTS

| | | |
|---|---|---|
| CN | 202205932 U | 4/2012 |
| EP | 3 454 137 A1 | 3/2019 |

* cited by examiner

MULTIFUNCTION CORRECTION DEVICE FOR A TIMEPIECE AND TIMEPIECE COMPRISING SUCH A MULTIFUNCTION CORRECTION DEVICE

CROSS REFERENCE TO RELATED APPLICATIONS

This application claims priority to European Patent Application No. 21215203.7 filed Dec. 16, 2021, the entire contents of which are incorporated herein by reference.

TECHNICAL FIELD OF THE INVENTION

The invention relates to a multifunction correction device for a timepiece allowing, for example, information displayed on a dial to be selected and/or modified by means of a single device.

The invention further relates to a timepiece comprising such a multifunction correction device allowing, for example, information displayed on a dial to be selected and/or modified, for example to correct, engage or reset several functions derived from the current time.

The invention further relates to a multifunction operating tool for operating a multifunction correction device according to the invention.

The invention further relates to a multifunction correction assembly comprising a multifunction correction device according to the invention and an operating tool according to the invention.

TECHNOLOGICAL BACKGROUND

A timepiece, in particular a wristwatch, allows the user to know the current time. This current time can be corrected by exerting an action (for example by pulling) on the winding stem until a certain position for this corrective action is reached.

The wristwatch can also be used to display, correct, engage and reset functions derived from the current time, generally referred to as complications, such as a date, time zone or chronograph, etc.

For this purpose, correction devices must be incorporated into the middle of the case of the wristwatch to allow these ancillary functions to be controlled and/or corrected.

These correction devices can be push buttons or corrector buttons.

Push buttons generally comprise a control member of the push-piece type positioned outside the watch middle and which is easily accessible to the user, the push buttons allowing the ancillary functions to be controlled and/or corrected without the user being required to use a tool.

Corrector buttons are typically miniature push buttons that are inset in the middle of the wristwatch and which can be operated using a small, and typically pointed, tool instead of a protruding push-piece that is easily accessible to and handled by the user. These corrector buttons are generally used for quick function corrections.

Some timepieces, and in particular watches, comprising a plurality of complications, offer their users a high number of functions that require multiplying the number of these correction devices on the case.

However, the multiplication of the number of correction devices in the middle poses layout problems and can lead to aesthetic problems, in particular for mid-range and top-range timepieces, where a sober and elegant appearance is sought.

The multiplication of the number of correction devices in the middle also creates sealing problems due to the multiplication of the number of openings in the watch case in order to integrate and mount the various correction means required.

SUMMARY OF THE INVENTION

In this context, the invention aims to propose a solution to the previously mentioned drawbacks of the prior art, by proposing a multifunction correction device allowing at least two different functions to be selected, activated and/or modified, using the same correction device requiring a single opening in the watch case middle to be mounted.

To this end, the invention relates to a multifunction correction device for the case of a timepiece comprising a horological movement, said multifunction correction device comprising:

- a cylindrical body configured to be made integral with said timepiece case;
- a primary correction module, capable of moving in translation relative to said cylindrical body in a first direction, said primary correction module comprising a primary control member that can be operated by the user, said primary control member being integral with a primary control stem, the primary control stem being capable of operating a first function corrector comprised in said horological movement when the primary control member is solicited by the user;

characterised in that said multifunction correction device comprises a secondary correction module, capable of moving in translation relative to the primary correction module in a second direction parallel to the first direction, said secondary correction module comprising a secondary control member that can be operated by the user, said secondary control member being integral with a secondary control stem, the secondary control stem being capable of operating a second function corrector comprised in said horological movement when the secondary control member is solicited by the user;

said cylindrical body receiving said primary correction module and said secondary correction module.

Thus, the user can easily activate a plurality of function correctors of said horological movement with a single correction device, by pressing the primary and/or secondary control members of the multifunction correction device according to the invention.

Thus, the multifunction correction device according to the invention allows the number of openings to be made in the middle of the timepiece case to be minimised. Thus, the problems concerning sealing, layout and aesthetics are avoided by reducing the number of correction devices to be implanted in the middle.

It should be noted that the multifunction correction device according to the invention is a correction device that is different from a setting crown connected to the winding stem which procures a time setting function, and optionally allows the barrel to be wound. Thus, the multifunction correction device according to the invention is not connected to a winding stem, for winding a barrel, and does not allow the current time of the movement to be set.

According to the invention, a correction device is understood to be either a push button which typically has a protruding push-piece control member located outside the middle of the case of the timepiece, or a corrector button which typically has a correction control member integrated into the thickness of the middle and accessible to the user from the outside of the case, for example using a tool.

In addition to the features mentioned in the preceding paragraph, the multifunction correction device according to the invention can have one or more complementary features from among the following, considered either on an individual basis or according to any combination technically possible:

- the primary correction module and the secondary correction module are configured such that they can be operated either individually or simultaneously;
- said secondary correction module is housed at least partially inside the primary correction module;
- said secondary correction module is coaxial with the primary correction module;
- the cylindrical body has the shape of a cylinder of revolution with an axis of revolution (X-X);
- the primary correction module is coaxial with the cylindrical body with an axis of revolution (X-X);
- the multifunction correction device is a push button configured to be partially housed in a middle of said timepiece case;
- the primary control member of the primary correction module is a push-piece;
- the secondary control member of the secondary correction module is a push-piece or a corrector housed inside the primary control member of the primary correction module and can be operated using a tool;
- the multifunction correction device is a corrector button configured to be fully integrated into the thickness of a middle of said timepiece case;
- the primary control member of the primary correction module and said secondary control member of the secondary correction module are correctors housed inside the middle of said timepiece case and can be operated using a tool;
- the primary control member of the primary correction module comprises a recess capable of receiving a geometrical configuration of an operating tool configured to operate the primary control member and/or the secondary control member;
- the recess constitutes a centring means capable of centring said operating tool;
- the multifunction correction device comprises a first return member provided between the cylindrical body and the primary correction module to ensure that the primary correction module returns to a rest position;
- the primary control stem comprises a tubular portion sliding inside the cylindrical body and an end configured to operate the first function corrector, said end having an external diameter that is greater than the external diameter of the tubular portion, said end forming a stop for positioning the primary correction module when returning to its rest position;
- the multifunction correction device comprises a second return member provided between the primary correction module and the secondary correction module to ensure that the secondary correction module returns to a rest position;
- the multifunction correction device comprises a first sealing member procuring a seal between the cylindrical body and the primary correction module, and a second sealing member procuring a seal between the primary correction module and the secondary correction module.

The invention further relates to a timepiece, for example a wristwatch, comprising a multifunction correction device according to the invention.

Advantageously, the timepiece comprises a case enclosing a horological movement comprising at least a first function corrector and a second function corrector, each function corrector allowing, in particular, at least one function derived from the current time to be displayed, corrected, selected, engaged or reset; said case having a middle comprising a housing in which a multifunction correction device according to the invention is mounted.

Advantageously, the primary correction module and the secondary correction module of the multifunction correction device are configured to interact respectively with the first function corrector and the second function corrector of the horological movement.

Advantageously, the timepiece comprises a case comprising a middle in which an opening is provided on the periphery of the middle, said multifunction correction device being driven into said opening or made integral therewith by screwing into said opening.

Advantageously, the first function corrector and the second function corrector are formed by superimposed pivoting levers.

Advantageously, the timepiece is a wristwatch.

Advantageously, the movement of the timepiece is a mechanical movement.

The invention further relates to an operating tool for operating the correction device according to the invention, the operating tool comprising a first operating stem and a second operating stem mounted coaxially and capable of moving in translation relative to one another, the first operating stem being configured to interact with the primary control member and the second operating stem being configured to interact with the secondary control member.

Advantageously, each of the operating stems can be operated independently and/or simultaneously by the user depending on the control member of the multifunction correction device that he/she wishes to operate.

Advantageously, the operating tool comprises an outer body and the two operating stems are capable of moving in translation relative to the outer body.

Advantageously, the operating tool has a geometrical configuration designed to cooperate with a recess provided in the multifunction correction device to centre each of the two operating stems such that they respectively face the primary control member and the secondary control member.

The invention further relates to a correction assembly comprising a multifunction correction device according to the invention and an operating tool according to the invention.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

Figure 1:
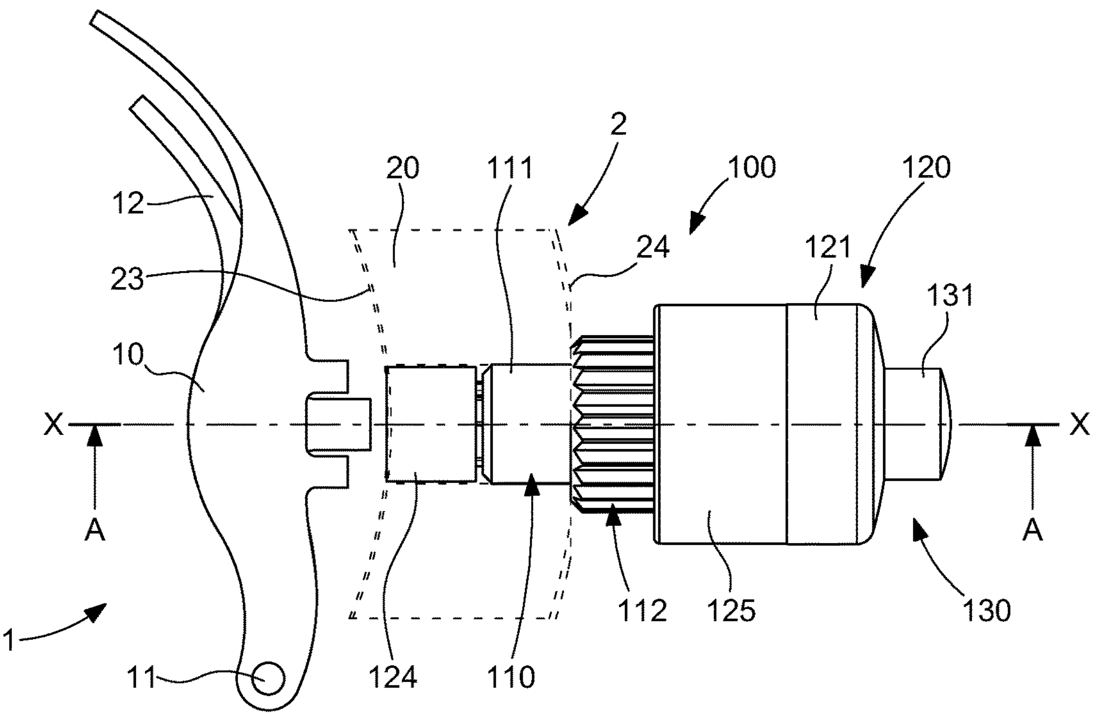
FIG. 1 shows a top view of a first example embodiment of a multifunction correction device according to the invention mounted in a timepiece case middle.

Generally speaking, and regardless of the example embodiment described herein, the multifunction correction device according to the invention comprises a cylindrical body 110 configured to be made integral with a middle 20 of a timepiece case 2, for example a watch case, a primary correction module 120 and a secondary correction module 130 housed at least in part inside the cylindrical body 110, and allowing a first function corrector 10 and a second function corrector 12 of a horological movement housed in the case 2 to be respectively activated.

The primary correction module 120 is capable of moving in translation relative to the cylindrical body 110 in a first direction. The secondary correction module 130 is capable of moving in translation relative to the cylindrical body 110 and relative to the primary correction module 120, in a second direction parallel to the first direction of translational movement of the primary correction module 120.

Advantageously, the primary correction module 120 is housed at least in part inside said cylindrical body 110, and the secondary correction module 130 is housed at least in part inside the primary correction module 120. For this purpose, the primary correction module 120 is configured to allow the secondary correction module 130 to move in translation inside the primary correction module 120.

Advantageously, the secondary correction module 130 is coaxial with the primary correction module 120.

Advantageously, the primary correction module 120 is coaxial with the cylindrical body 110.

According to other, alternative embodiments, the secondary correction module 130 can also be housed at least in part directly inside the cylindrical body, and parallel to the primary correction module 120.

FIG. 1 shows a top view of a first example embodiment of a multifunction correction device 100 according to the invention mounted in a middle 20 of a timepiece case 2.

The timepiece case 2 is, for example, a wristwatch case.

The case 2 comprises a middle 20 with an outer face 24 and an inner face 23. The inner face 23 of the middle 20 delimits an internal space intended to receive a horological movement 1 (not shown in its entirety).

The horological movement 1 carries and drives means for displaying the current time and comprises in particular at least one complication for displaying at least one piece of information derived from the current time. To this end, the horological movement 1 comprises a plurality of function correctors 10, 12 allowing at least one piece of information derived from the current time to be displayed, corrected, selected, engaged and/or reset.

In the example embodiment shown, the horological movement 1 comprises a first function corrector 10 and a second function corrector 12 allowing at least one function derived from the current time to be displayed, corrected, selected, engaged or reset. However, this representation is not limiting in nature.

For example, the horological movement 1 can comprise a complication such as a date, time zone, or chronograph, etc.

The function correctors 10, 12 are, for example, superimposed levers mounted such that they pivot about a pivot pin 11, as shown in particular in FIG. 1. However, other types of function correctors can be considered.

Figure 2:
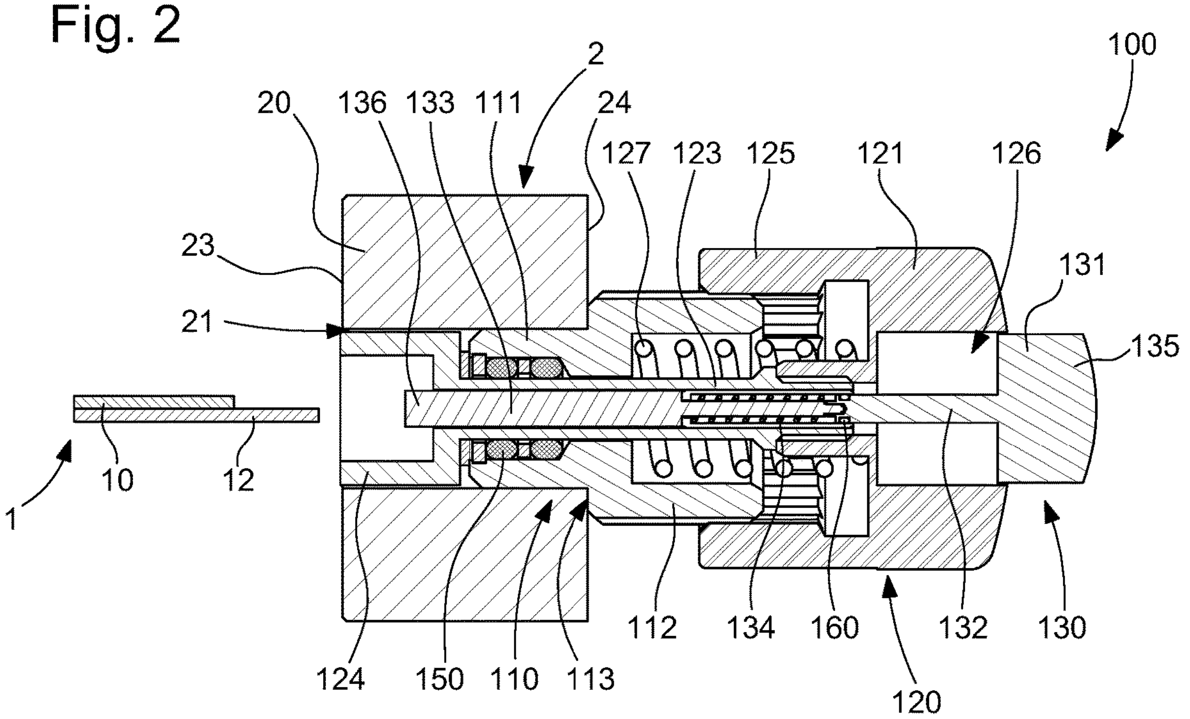
FIG. 2 shows a sagittal sectional view, along the axis A-A illustrated in FIG. 1, of the first example embodiment of the multifunction correction device according to the invention.

FIG. 2 shows a sagittal sectional view, along the axis A-A illustrated in FIG. 1, of the first example embodiment of the multifunction correction device 100 according to the invention.

In this first example embodiment, shown with reference to FIGS. 1 to 2, the multifunction correction device 100 is of the multifunction push button type.

The multifunction correction device 100 comprises a cylindrical body 110 configured to be made integral with the case 2, and more particularly to be mounted in the middle 20. The cylindrical body 110 can have a circular section or polygonal section.

In the example embodiment shown in FIGS. 1 to 2, the cylindrical body 110 is a cylinder of revolution with an axis of revolution X-X.

The cylindrical body 110 comprises a tubular part 111 and a head 112, the head 112 forming a first end of the cylindrical body 110.

The tubular part 111 can have a threaded portion for the assembly thereof to the middle 20 of the case 2. To this end, the middle 20 comprises a through-housing 21 comprising a tapped portion for mounting the multifunction correction device 100 according to the invention.

According to an alternative embodiment, the tubular part 111 can be driven directly into the housing of the middle 20.

The head 112 is the part of the cylindrical body 110 that remains on the outside of the middle 20, i.e. on the side opposite the horological movement 1.

The head 112 has a larger diameter than the diameter of the tubular part 111, such that a shoulder 113 separates the head 112 from the tubular part 111. The shoulder 113 thus forms a bearing surface, or a stop surface, intended to come into contact with the outer face 24 of the middle 20 of the case 2 when the multifunction correction device 100 is mounted.

The multifunction correction device 100 further comprises:

- a primary correction module 120 comprising a primary control member 121 integral with a primary control stem 123, the primary control stem 123 being capable of operating the first function corrector 10 of the horological movement 1 mounted in said case 2; the primary correction module 120 being capable of moving in translation relative to the cylindrical body 110; optionally, the primary correction module 120 can be free to rotate relative to the cylindrical body 110, about the axis of revolution X-X;
- a secondary correction module 130 comprising a secondary control member 131 integral with a secondary control stem 133, the secondary control stem 133 being capable of operating the second function corrector 12 of the horological movement 1 mounted in the case 2; the secondary control module 130 being capable of moving in translation relative to the primary control module 120 and relative to the cylindrical body 110; optionally, the secondary control module 130 can also be free to rotate about the axis of revolution X-X relative to the primary control module 120.

In this first example embodiment, the primary control member 121 is a push-piece, referred to as a primary push-piece, and the secondary control member 131 is a push-piece, referred to as a secondary push-piece.

A push-piece is understood to mean the movable and protruding part of a user-operated push-button intended to be outside the middle of a watch case.

The primary correction module 120 is capable of moving in translation in a first direction, parallel to the axis of revolution X-X.

The secondary correction module 130 is capable of moving in translation in a second direction, parallel to the first direction, itself parallel to the axis of revolution X-X.

The cylindrical body 110 is configured to receive, at least in part, the primary correction module 120 and the secondary correction module 130.

Preferably, the primary correction module 120 is configured to receive, at least in part, the secondary correction module 130.

The primary control stem 123 of the primary correction module 120 slides inside the cylindrical body 110; more specifically, in an internal bore through the cylindrical body 110 provided to receive the primary control stem 123.

Preferably, the primary control stem 123 is coaxial with the cylindrical body 110.

The primary control stem 123 is a hollow control stem inside which the secondary control stem 133 of the secondary correction module 130 slides in a direction parallel to the axis of revolution X-X.

Preferably, the secondary control stem 133 is coaxial with the primary control stem 123.

The primary push-piece 121 is made integral with the primary control stem 123, for example by screwing or driving in.

In the example embodiment shown in FIGS. 1 to 2, the primary push-piece 121 is screwed to a first end of the primary control stem 123.

The primary control stem 123 comprises a control stem head forming the first end, having a threading, provided on a peripheral portion, to receive the primary push-piece 121 by screwing.

The primary control stem 123 further comprises:

- a tubular portion forming the body as well as the central portion of the primary control stem 123, the tubular portion being the portion that slides inside the cylindrical body 110;
- a second end 124 intended to come into contact with and operate the first function corrector 10, when the first push-piece 121 is operated by the user.

The second end 124 of the primary control stem 123 advantageously has an external diameter greater than the external diameter of the tubular portion. Thus, the second end 124 is also configured to form a stop that comes to bear against the cylindrical body 110, and more particularly against the tubular part 111 of the cylindrical body 110, when returning to a rest position of the primary correction module 120.

Thus, the second end 124 forms means for ensuring a stable rest position for the primary correction module 120.

The return to the stable rest position of the primary correction module 120 is ensured by a primary return member 127, for example a return spring, positioned between the cylindrical body 110, fixed in the middle 20, and the primary correction module 120, more particularly the primary push-piece 121, which is capable of moving in translation.

To this end, the cylindrical body 110 comprises an end cavity formed at the head 112 and configured to receive a first end of the primary return member 127 such that it bears thereagainst. The second end of the primary return member 127 comes to bear against an internal portion of the primary push-piece 121.

In the example embodiment shown, the primary push-piece 121 is capsule-shaped and comprises a peripheral portion 125 capable of at least partially covering the cylindrical body 110, in particular when the primary push-piece 121 is operated by the user.

The multifunction correction device 100 can further comprise axial guide means for improving the axial guidance of the primary control module 120, and in particular of the primary push-piece 121, during the axial displacement thereof. The guide means can also form anti-rotation means preventing the primary correction module 120 from rotating about the axis of revolution X-X.

By way of example, the guide means can be formed by the cooperation of protruding elements, for example flutes, provided on the outer peripheral portion of the head 112 of the cylindrical body 110 and by hollowings, of complementary shape, for example grooves, provided at the radially inner wall (with respect to the axis of revolution X-X) of the peripheral portion 125 of the primary push-piece 121. It goes without saying that a different disposition of the protruding elements and hollowings is also possible without going beyond the scope of the invention.

The axial guide means thus allow the rotation of the primary push-piece 121, and more generally of the primary correction module 120 to be blocked relative to the cylindrical body 110.

According to an alternative embodiment (not shown), the rotation of the primary correction module 120 relative to the cylindrical body 110 is left free, such that the primary push-piece 121, and more generally the primary correction module 120, is free to pivot about the axis of revolution X-X. In this alternative embodiment, the primary correction module 120 is guided axially by means of the primary control stem 123 cooperating with the internal bore of the cylindrical body 110.

The secondary push-piece 131 of the secondary correction module 130 comprises a secondary push-piece head 135 and a secondary push-piece stem 132 configured to be made integral with a first end of the secondary control stem 133, for example by screwing or driving in.

The second end 136 of the secondary control stem 133 is intended to come into contact with and operate the second function corrector 12 of the horological movement 1 mounted inside the case 2, when the secondary push-piece 131 is operated by the user.

The secondary push-piece 131 is configured so that it can move and slide inside the primary push-piece 121, and more particularly in a central hollowing 126. Thus, when the secondary push-piece 131 is operated, it becomes housed inside the central hollowing 126 of the primary push-piece 121.

Advantageously, the secondary push-piece 131 is coaxial with the primary push-piece 121.

In the same way as with the primary correction module 120, the secondary correction module 130 comprises a secondary return member 134 configured to ensure the return of the secondary push-piece 131 to a stable rest position.

The secondary return member 134 is, for example, a return spring, positioned between the primary control stem 133 and the secondary push-piece 131. By way of example, the secondary return member 134 is mounted under stress between a frame, integral with the primary control stem 123 and allowing the secondary control stem 133 to move, and the end of the secondary push-piece stem 132.

The multifunction correction device 100 can further comprise means for blocking the rotation of the secondary correction module 130 relative to the primary correction module 120.

According to an alternative embodiment, the multifunction correction device 100 can further comprise a safety member (not shown) to prevent simultaneous activation of the primary push-piece 121 and of the secondary push-piece 131. In an alternative embodiment, the safety member can be carried by the horological movement.

According to an alternative embodiment, the multifunction correction device 100 is configured to allow the primary push-piece 121 and the secondary push-piece 131 to be operated simultaneously in order to simultaneously display, correct, select, engage, or reset two functions derived from the current time, via the two function correctors 10, 12.

The multifunction correction device 100 further comprises sealing elements to procure a seal between the movable elements of the multifunction correction device 100, and between the cylindrical body 110 and the primary correction module 120.

The multifunction correction device 100 comprises a first sealing member 150 provided between the cylindrical body 110 and the primary correction module 120. The first sealing member is, for example, formed by one or two O-rings superimposed on one another.

The multifunction correction device 100 comprises a second sealing member 160 provided between the primary correction module 120 and the secondary correction module 130. The second sealing member 160 is, for example, an O-ring.

The sealing members 150, 160 are configured to provide the required seal between the interior of the case 2 and the exterior of the case 2 while allowing the movable parts to move in translation and/or in rotation.

Figure 3:
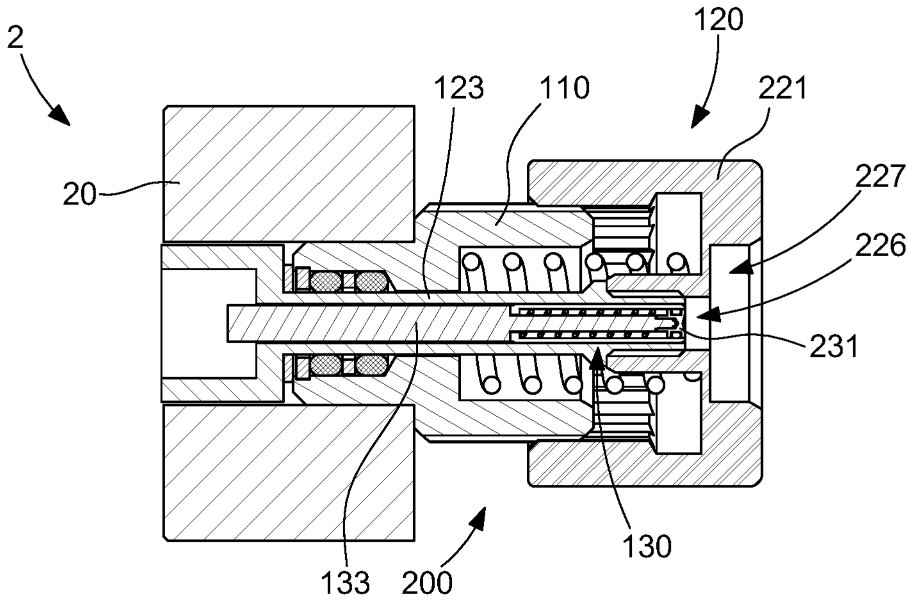
FIG. 3 shows a sagittal sectional view of a second example embodiment of the multifunction correction device according to the invention.

FIG. 3 shows a second example embodiment of a multifunction correction device according to the invention.

With reference to FIG. 3, the multifunction correction device 200 is identical to the multifunction correction device 100 described hereinabove except as regards the features that will be described hereinbelow.

In this second example embodiment, the secondary push-piece 131 described hereinabove is replaced by a miniature corrector 231 integral with the end of the secondary control stem 133. The miniature corrector 231 is smaller in size and is housed inside the primary push-piece 221. The corrector 231 is accessible to the user using a small, pointed operating tool that can be inserted through a central cavity 226 provided in the primary push-piece 221.

The primary push-piece 221 further comprises a recess 227 configured to receive a geometrical configuration of the operating tool. Advantageously, the recess 227 forms a means of positioning and centring the operating tool, allowing an operating stem comprised in the operating tool to be correctly positioned such that it faces the small corrector 231. This facilitates handling and correction operations.

In the example embodiment shown in FIG. 3, the central cavity 226 is provided in the centre of the recess 227.

According to an alternative embodiment, the periphery of the primary push-piece 221 can form means for centring an operating tool in order to correctly position an operating stem comprised in the operating tool facing the small corrector 231.

The primary push-piece 221 in this second example embodiment has the same features as those previously stated with reference to the primary push-piece 121.

Such an alternative embodiment allows a second correction function, for example of the date type, to be associated with the primary push-piece 221, while offering a sober and classic design. Thus, this second example embodiment can easily be associated with a single-function push button of the prior the art on the same middle 20 of the case 2, without reducing its overall aesthetics.

Figure 4:
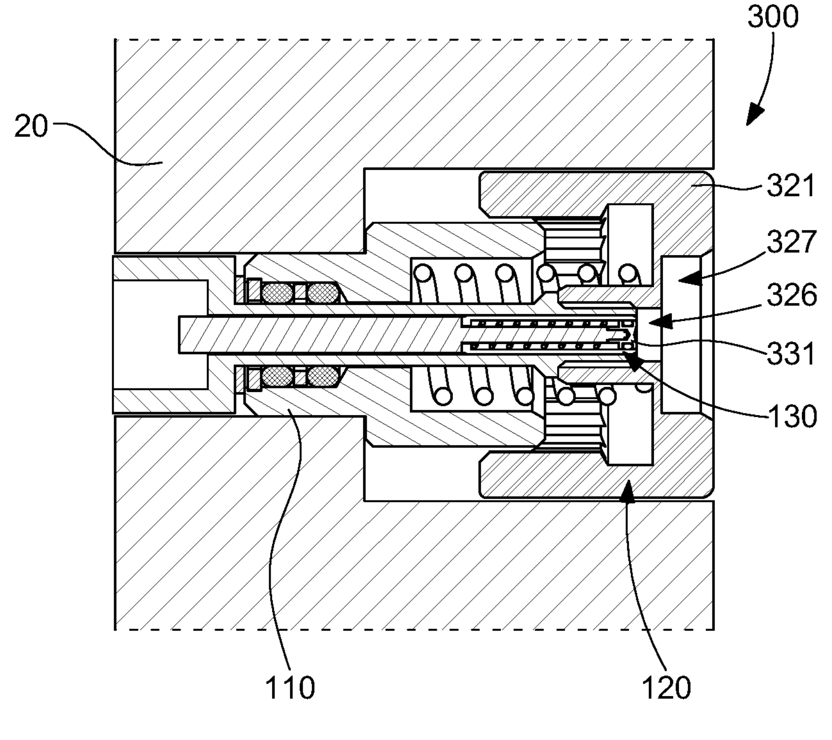
FIG. 4 shows a sagittal sectional view of a third example embodiment of a multifunction correction device according to the invention.

FIG. 4 shows a third example embodiment of a multifunction correction device according to the invention.

With reference to FIG. 4, the multifunction correction device 300 is identical to the multifunction correction device 100 described hereinabove except as regards the features that will be described hereinbelow.

In this third example embodiment, the multifunction correction device 300 is of the miniature multifunction corrector type intended to be fully integrated into the middle 20 of the case 2.

In this third example embodiment, the primary control member 321 and the secondary control member 331 are correctors housed inside the middle 20 of the case 2.

The primary 321 and secondary 331 control members can be operated by the user using a small multifunction operating tool 400 for selecting and operating the control members.

Figure 5:
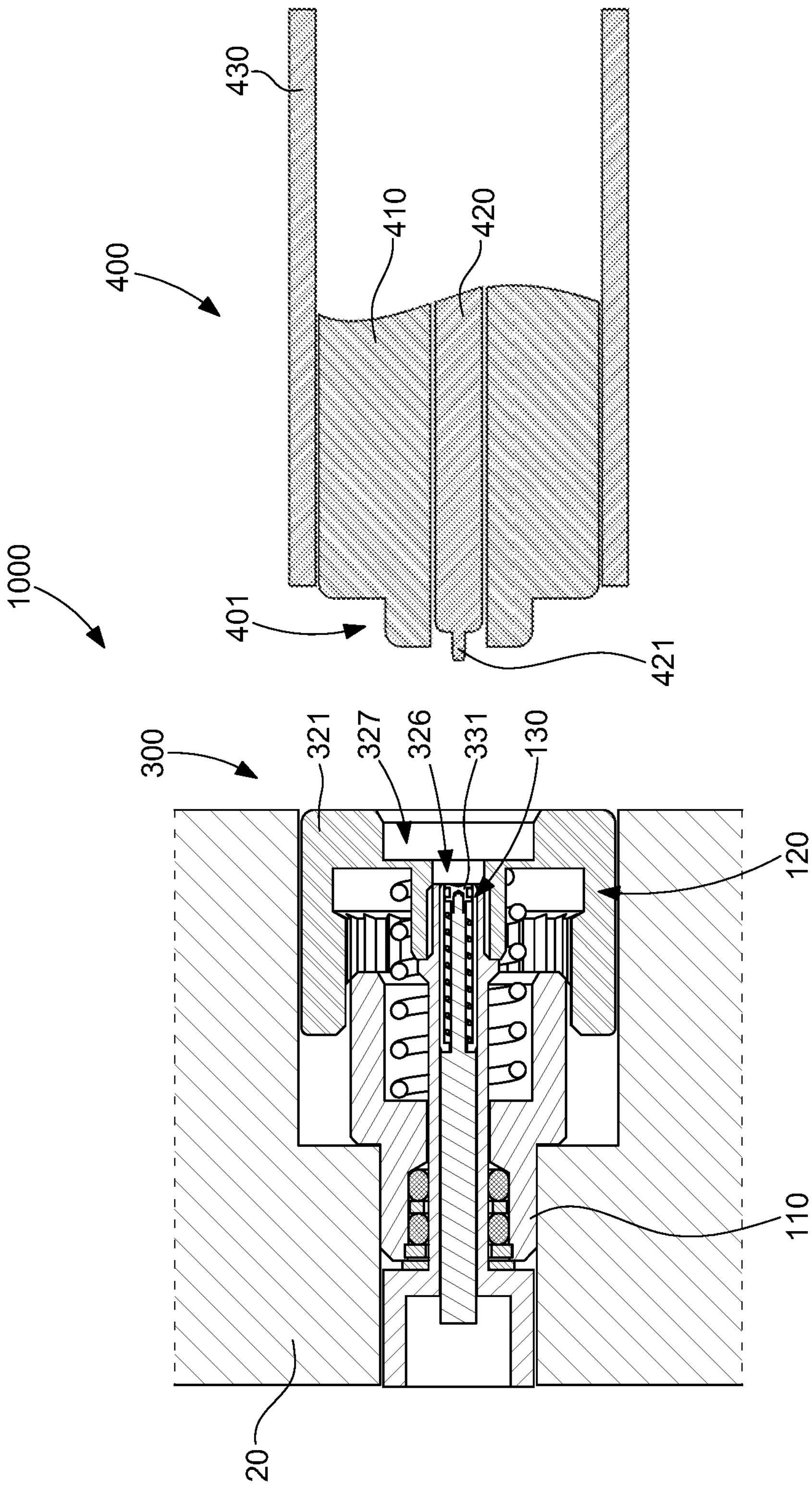
FIG. 5 shows a sagittal sectional view of a multifunction operating tool positioned facing the multifunction correction device in FIG. 4.

To this end, the invention further relates to a multifunction operating tool 400 shown via a sagittal sectional view in FIG. 5, and positioned facing the multifunction correction device 300.

The operating tool 400 comprises a first operating stem 410 and a second operating stem 420 mounted coaxially and such that they can move in translation relative to one another, such that the second operating stem 420 is capable of moving in translation inside the first operating stem 410.

The first operating stem 410 is configured to interact with the primary control member 321 and the second operating stem 420 is configured to interact with the secondary control member 331, via the pointed end 421 thereof.

The operating tool 400 is configured so that each of the operating stems 410, 420 can be operated independently and/or simultaneously by the user depending on the control member he/she wishes to operate.

According to an alternative embodiment, the operating tool 400 can further comprise a hollow outer body 430 configured to receive the first operating stem 410, the first operating stem 410 being capable of moving in translation inside the outer body 430.

The operating tool 400 has a geometrical configuration designed to cooperate with a recess 327 provided in the multifunction correction device 300, or in the middle 20, to position and centre each of the two operating stems 410, 420 such that they respectively face the primary control member 321 and the secondary control member 331.

In the example embodiment shown, the recess 327 is provided on the primary control member 231 and is configured to receive the end 401 of the first operating stem 410 forming the geometrical configuration of the operating tool 400.

However, other alternative embodiments can be considered, such as making a recess in the middle designed to cooperate with a geometrical configuration of the operating tool 400 formed, for example, by an end of an outer body.

In the example embodiment shown, the end 401 of the first operating stem 410 allows the second operating stem 420 to be correctly positioned and centred such that it faces the very small secondary control member 331. This facilitates handling and correction operations.

The recess 327 has a central cavity 326 at its centre to allow the second operating stem 420 to pass through and to allow the secondary control member 331 to be operated by means of the primary control member 321 of the multifunction correction device 300.

The invention has been described in particular with two correction modules; however, a third correction module can also be integrated therein according to the various examples and alternative embodiments described hereinabove.

For example, the third correction module could be housed and move in translation inside a second correction module, itself housed and moving in translation inside a first correction module.

It goes without saying that the number of correction modules of the multifunction correction device can also be multiplied insofar as this is technically possible and compatible with the typical and reasonable dimensions of a correction device that can be housed in a middle of a timepiece.

The invention further relates to a timepiece, such as a wristwatch, comprising a case 2 enclosing a horological movement 1 comprising at least two function correctors 10, 12 for displaying, correcting, selecting, engaging or resetting functions derived from the current time, such as a date, a time zone, or a chronograph, etc.

The case 2 comprises a middle 20 comprising a housing 21 in which a multifunction correction device 100, 200, 300 according to the invention is mounted, by driving in or screwing, the multifunction correction device comprising a primary correction module 120 and a secondary correction module 130 which can be operated by the user at the middle 20 of the case 2, the primary correction module 120 and the secondary correction module 130 interacting respectively with the first and the second function correctors 10, 12 of the horological movement in order to display, correct, select, engage or reset a function derived from the current time.

The invention further relates to a correction assembly 1000 comprising a correction device 100, 200, 300 according to the invention and a multifunction operating tool 400 according to the invention.

The invention claimed is:

1. A multifunction correction device (100, 200, 300) for a case (2) of a timepiece comprising a horological movement (1), said multifunction correction device (100, 200, 300) comprising:

- a cylindrical body (110) configured to be made integral with said timepiece case (2);
- a primary correction module (120), capable of moving in translation relative to said cylindrical body (110) in a first direction, said primary correction module (120) comprising a primary control member (121) that can be operated by a user, said primary control member (121) being integral with a primary control stem (123), the primary control stem (123) being capable of operating a first function corrector (10) comprised in said horological movement (1) when the primary control member (121) is solicited by the user;
- wherein said multifunction correction device (100, 200, 300) comprises a secondary correction module (130), capable of moving in translation relative to the primary correction module (120) in a second direction parallel to the first direction, said secondary correction module (130) comprising a secondary control member (131) that can be operated by the user, said secondary control member (131) being integral with a secondary control stem (133), the secondary control stem (133) being capable of operating a second function corrector (12) comprised in said horological movement (1) when the secondary control member (131) is solicited by the user;
- said cylindrical body (110) receiving said primary correction module (120) and said secondary correction module (130),
- wherein the secondary correction module (130) is configured to protrude moreso from the timepiece case (2) than is the primary correction module (120), and
- wherein said multifunction correction device (100, 200, 300) comprises:
  - a first return member (127) provided between the cylindrical body (110) and the primary correction module (120) to ensure that the primary correction module (120) returns to a rest position; and
  - a second return member (134) provided between the primary correction module (120) and the secondary correction module (130) to ensure that the secondary correction module (130) returns to a rest position, and
- wherein part of the primary control member (121) is between the first return member (127) and the second return member (134) at least at a position where the primary control member (121) abuts the primary control stem (123).

2. The multifunction correction device (100, 200, 300) according to claim 1, wherein said primary correction module (120) and said secondary correction module (130) are configured such that they can be operated either individually or simultaneously.

3. The multifunction correction device (100, 200, 300) according to claim 1, wherein said secondary correction module (130) is housed at least partially inside the primary correction module (120).

4. The multifunction correction device (100, 200, 300) according to claim 1, wherein said secondary correction module (130) is coaxial with the primary correction module (120).

5. The multifunction correction device (100, 200, 300) according to claim 1, wherein the cylindrical body (110) has the shape of a cylinder of revolution with an axis of revolution (X-X).

6. The multifunction correction device (100, 200, 300) according to claim 5, wherein the primary correction module (120) is coaxial with the cylindrical body (110) with the axis of revolution (X-X).

7. The multifunction correction device (100, 200) according to claim 1, wherein said multifunction correction device (100, 200) is a push button configured to be partially housed in a middle (20) of said timepiece case (2).

8. The multifunction correction device (100, 200) according to claim 7, wherein said primary control member (121) of the primary correction module (120) is a push-piece.

9. The multifunction correction device (100, 200) according to claim 7, wherein said secondary control member (131, 231) of the secondary correction module (130) is a push-piece or a corrector housed inside the primary control member (221) of the primary correction module (120) and can be operated using a tool.

10. The multifunction correction device (100, 200, 300) according to claim 1, wherein the primary control stem (123) comprises a tubular portion sliding inside the cylindrical body (110) and an end (124) configured to operate the first function corrector (10), said end (124) having an external diameter that is greater than an external diameter of the tubular portion, said end (124) forming a stop for positioning the primary correction module (120) when returning to a rest position.

11. The multifunction correction device (100, 200, 300) according to claim 10, wherein the part of the primary control member and a part of the primary control stem (123) are both between the first return member (127) and the second return member (134) at the position where the part of the primary control member (121) abuts the primary control stem (123).

12. The multifunction correction device (100, 200, 300) according to claim 1, wherein said multifunction correction device (100, 200, 300) comprises a first sealing member (150) procuring a seal between the cylindrical body (110) and the primary correction module (120), and a second sealing member (160) procuring a seal between the primary correction module (120) and the secondary correction module (130).

13. A timepiece comprising a case (2) enclosing a horological movement (1) comprising at least a first function corrector (10) and a second function corrector (12), each function corrector (10, 12) allowing a function derived from the current time to be displayed, corrected, selected, engaged or reset; said case (2) having a middle (20) comprising a housing (21) in which a multifunction correction device (100, 200, 300) according to claim 1 is mounted;

the primary correction module (120) and the secondary correction module (130) of the multifunction correction device (100, 200, 300) being configured to interact respectively with the first function corrector (10) and the second function corrector (12) of the horological movement (1).

14. A multifunction correction device (100, 200, 300) for a case (2) of a timepiece comprising a horological movement (1), said multifunction correction device (100, 200, 300) comprising:

a cylindrical body (110) configured to be made integral with said timepiece case (2);

a primary correction module (120), capable of moving in translation relative to said cylindrical body (110) in a first direction, said primary correction module (120) comprising a primary control member (121) that can be operated by a user, said primary control member (121) being integral with a primary control stem (123), the primary control stem (123) being capable of operating a first function corrector (10) comprised in said horological movement (1) when the primary control member (121) is solicited by the user;

wherein said multifunction correction device (100, 200, 300) comprises a secondary correction module (130), capable of moving in translation relative to the primary correction module (120) in a second direction parallel to the first direction, said secondary correction module (130) comprising a secondary control member (131) that can be operated by the user, said secondary control member (131) being integral with a secondary control stem (133), the secondary control stem (133) being capable of operating a second function corrector (12) comprised in said horological movement (1) when the secondary control member (131) is solicited by the user;

said cylindrical body (110) receiving said primary correction module (120) and said secondary correction module (130), wherein said multifunction correction device (300) is a miniature corrector button configured to be fully integrated into a thickness of a middle (20) of said timepiece case (2).

15. The multifunction correction device (300) according to claim 14, wherein said primary control member (321) of the primary correction module (120) and said secondary control member (331) of the secondary correction module (130) are correctors housed inside the middle (20) of said timepiece case (2) and can be operated using a tool.

16. An operating tool (400) for operating said multifunction correction device (300) according claim 4, said operating tool (400) comprising a first operating stem (410) and a second operating stem (420) mounted coaxially and capable of moving in translation relative to one another, the first operating stem (410) being configured to interact with the primary control member (321) and the second operating stem (420) being configured to interact with the secondary control member (331).

17. The operating tool (400) according to claim 16, wherein each of the operating stems (410, 420) can be operated independently and/or simultaneously by the user depending on the control member (321, 331) of the multifunction correction device (300) that he/she wishes to operate.

18. The operating tool (400) according to claim 16, wherein the operating tool (400) comprises an outer body (430) and wherein the two operating stems (410, 420) are capable of moving in translation relative to the outer body (430).

19. The operating tool (400) according to claim 16, further comprising a geometrical configuration (401) designed to cooperate with a recess (327) provided in the multifunction correction device (300) to centre each of the two operating stems (410, 420) such that they respectively face the primary control member (321) and the secondary control member (331).

20. A multifunction correction device (100, 200, 300) for a case (2) of a timepiece comprising a horological movement (1), said multifunction correction device (100, 200, 300) comprising:

a cylindrical body (110) configured to be made integral with said timepiece case (2);

a primary correction module (120), capable of moving in translation relative to said cylindrical body (110) in a first direction, said primary correction module (120) comprising a primary control member (121) that can be operated by a user, said primary control member (121) being integral with a primary control stem (123), the primary control stem (123) being capable of operating a first function corrector (10) comprised in said horological movement (1) when the primary control member (121) is solicited by the user;

wherein said multifunction correction device (100, 200, 300) comprises a secondary correction module (130), capable of moving in translation relative to the primary correction module (120) in a second direction parallel to the first direction, said secondary correction module (130) comprising a secondary control member (131) that can be operated by the user, said secondary control member (131) being integral with a secondary control stem (133), the secondary control stem (133) being capable of operating a second function corrector (12) comprised in said horological movement (1) when the secondary control member (131) is solicited by the user;

said cylindrical body (110) receiving said primary correction module (120) and said secondary correction module (130), wherein said multifunction correction device (100, 200) is a push button configured to be partially housed in a middle (20) of said timepiece case (2), wherein said secondary control member (131, 231) of the secondary correction module (130) is a push-piece or a corrector housed inside the primary control member (221) of the primary correction module (120) and can be operated using a tool, wherein said primary control member (221, 321) of the primary correction module (120) comprises a recess (227, 327) capable of receiving an end (401) of an operating tool (400) configured to operate the primary control member (221, 321) and/or the secondary control member (231, 331).

21. The multifunction correction device (300) according to claim 20, wherein the recess (227, 327) constitutes a centring means capable of centring said operating tool (400).

22. A correction assembly (1000) comprising a correction device according to claim 20.

* * * * *